(12) United States Patent
Eo

(10) Patent No.: US 9,335,234 B2
(45) Date of Patent: May 10, 2016

(54) METHOD FOR DETERMINING DETERIORATION OF DRY CLUTCH FOR HYBRID VEHICLE

(71) Applicant: HYUNDAI MOTOR COMPANY, Seoul (KR)

(72) Inventor: Jeong Soo Eo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/563,825

(22) Filed: Dec. 8, 2014

(65) Prior Publication Data

US 2015/0307087 A1 Oct. 29, 2015

(30) Foreign Application Priority Data

Apr. 24, 2014 (KR) .......................... 10-2014-0049258

(51) Int. Cl.
| | |
|---|---|
| *G01M 13/00* | (2006.01) |
| *G01M 13/02* | (2006.01) |
| *B60W 20/00* | (2016.01) |
| *F16D 13/58* | (2006.01) |
| *F16D 48/06* | (2006.01) |

(52) U.S. Cl.
CPC ............ *G01M 13/022* (2013.01); *B60W 20/50* (2013.01); *F16D 13/58* (2013.01); *F16D 48/06* (2013.01); *F16D 2500/1066* (2013.01); *F16D 2500/3067* (2013.01); *F16D 2500/3068* (2013.01); *F16D 2500/30401* (2013.01); *F16D 2500/3122* (2013.01); *F16D 2500/5023* (2013.01); *Y10S 903/902* (2013.01)

(58) Field of Classification Search
CPC ............... B60W 20/50; F16D 13/58; F16D 2500/3068; F16D 903/902; F16D 2500/3122; F16D 2500/5023; Y10S 903/902; G01M 13/00; G01M 13/022
USPC ........... 701/22, 67, 68, 29.1, 31.1; 192/85.19
See application file for complete search history.

(56) References Cited

U.S. PATENT DOCUMENTS 8,600,612 B2 * 12/2013 Kneissler ............... F16D 48/06 701/32.8
8,874,339 B2 * 10/2014 Yoon ..................... F16D 48/06 701/67

(Continued)

FOREIGN PATENT DOCUMENTS

| JP | 9-42440 A | 2/1997 |
|---|---|---|
| JP | 2006-331219 A | 12/2006 |

(Continued)

*Primary Examiner* — Thomas Tarcza
*Assistant Examiner* — Tyler J Lee
(74) *Attorney, Agent, or Firm* — McDermott Will & Emery LLP

(57) ABSTRACT

A method for determining deterioration of a dry clutch mounted between an engine and a motor of a hybrid vehicle includes determining whether an entry condition to determine the deterioration of the dry clutch is satisfied. Roughness of the dry clutch is determined when the entry condition is satisfied. A deviation between the roughness of the dry clutch and a reference value is calculated, and the deviation is compared with a threshold value. A roughness counter of the dry clutch is increased when the deviation is larger than the threshold value. The roughness counter of the dry clutch is compared with a boundary value. It is determined that the dry clutch deteriorates when the roughness counter of the dry clutch is larger than the boundary value.

18 Claims, 7 Drawing Sheets

(56) References Cited

U.S. PATENT DOCUMENTS

| | | | | |
|---|---|---|---|---|
| 8,897,980 | B2* | 11/2014 | Yoon | F16H 61/0437 192/13 R |
| 2007/0294017 | A1* | 12/2007 | Joshi | F16D 48/06 701/67 |
| 2009/0143189 | A1* | 6/2009 | Hasegawa | B60K 6/48 477/5 |
| 2013/0179030 | A1* | 7/2013 | Kneissler | F16D 48/06 701/33.7 |
| 2014/0121924 | A1* | 5/2014 | Yoon | F16D 48/06 701/67 |
| 2014/0121926 | A1* | 5/2014 | Yoon | F16H 61/0437 701/68 |
| 2015/0073673 | A1* | 3/2015 | Hata | F16D 48/06 701/68 |
| 2015/0167759 | A1* | 6/2015 | Lee | F16D 48/06 701/68 |

FOREIGN PATENT DOCUMENTS

| | | |
|---|---|---|
| JP | 2009-137329 A | 6/2009 |
| KR | 10-2007-0101847 A | 10/2007 |

\* cited by examiner

METHOD FOR DETERMINING DETERIORATION OF DRY CLUTCH FOR HYBRID VEHICLE

CROSS-REFERENCE TO RELATED APPLICATION

This application claims the benefit of priority to Korean Patent Application No. 10-2014-0049258 filed in the Korean Intellectual Property Office on Apr. 24, 2014, the entire contents of which are incorporated herein by reference.

TECHNICAL FIELD

The present disclosure relates to a method for determining a deterioration of a dry clutch for a hybrid vehicle.

BACKGROUND

A hybrid vehicle uses power of an internal combustion engine and power of a motor which are efficiently combined. The hybrid vehicle generally includes an engine clutch which controls the engine power, the motor power, and power between the engine and the motor, a transmission, a differential gear mechanism, a high voltage battery, an integrated starter generator (ISG) which starts the engine and generates power by an output of the engine, and a wheel. The ISG may be referred to as a hybrid starter generator (HSG).

The hybrid vehicle provides driving based on driving modes, such as an electric vehicle (EV) mode which uses only the motor power by coupling or releasing the engine clutch depending on driver's acceleration and deceleration intention based on an operation of an accelerator pedal and a brake pedal, a vehicle speed, a state of charge of the battery, and the like. A hybrid electric vehicle (HEV) mode uses a torque of the motor as an auxiliary power while using a torque of the engine as a main power. A regenerative braking mode recovers braking and inertial energy generated when the vehicle runs by braking or inertia of the vehicle by power generation of the motor and charges the recovered braking and inertial energy in the high voltage battery.

The hybrid vehicle uses mechanical energy of the engine and electrical energy of the high voltage battery together and an optimal operational range of the engine and the motor. Then, the hybrid vehicle recovers energy when braking to improve fuel efficiency and to use the energy more efficiently.

The hybrid vehicle includes a wet clutch or a dry clutch between different power sources to distribute the power from the different power sources. The wet clutch facilitates lubrication and cooling and controls a good amount of slip to satisfy starting performance and driving performance, and thus, the fuel efficiency decreases in the dry clutch. The dry clutch is inferior to wet clutch in terms of heat capacity but is superior to the wet clutch in terms of responsiveness and fuel efficiency.

The dry clutch is inferior to the wet clutch in terms of a lubrication and cooling scheme, and therefore, a method for determining deterioration of the dry clutch is necessary.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a method for determining deterioration of a dry clutch for a hybrid vehicle based on signals of a crank shaft rotation sensor and a resolver.

According to an exemplary embodiment of the present inventive concept, a method for determining deterioration of a dry clutch mounted between an engine and a motor of a hybrid vehicle includes determining whether an entry condition to determine the deterioration of the dry clutch mounted between the engine and the motor is satisfied. Roughness of the dry clutch is determined when the entry condition is satisfied. A deviation between the roughness of the dry clutch and a reference value is calculated. The deviation is compared with a threshold value. A roughness counter of the dry clutch is increased when the deviation is larger than the threshold value. The roughness counter of the dry clutch is compared with a boundary value. It is determined that the dry clutch mounted between the engine and the motor deteriorates when the roughness counter of the dry clutch is larger than the boundary value. The roughness of the dry clutch is at least any one of a change in an engine angular velocity, a change in an engine angular acceleration, and a change in a period of the engine angular velocity.

The entry condition may include a condition that the dry clutch mounted between the engine and the motor is in a slip state and a dry clutch mounted between the motor and a transmission is in an engaged state.

The entry condition may further include a condition that a crank shaft rotation sensor is in a normal state and a condition that the hybrid vehicle is in a normal state.

The entry condition may further include an environmental condition which includes an outdoor temperature condition that an outdoor temperature is in a predetermined outdoor temperature range and an atmospheric pressure condition that an atmospheric pressure is in a predetermined atmospheric pressure range.

The method may further include reducing the roughness counter of the dry clutch mounted between the engine and the motor when the deviation is equal to or smaller than the threshold value.

According to another embodiment of the present inventive concept, a method for determining deterioration of a dry clutch mounted between a motor and a transmission of a hybrid vehicle includes determining whether an entry condition to determine the deterioration of the dry clutch mounted between the motor and the transmission is satisfied. Roughness of the dry clutch is determined when the entry condition is satisfied. A deviation between the roughness of the dry clutch and a reference value is calculated. The deviation is compared with a threshold value. A roughness counter of the dry clutch is increased when the deviation is larger than the threshold value. The roughness counter of the dry clutch is compared with a boundary value. It is determined that the dry clutch deteriorates when the roughness counter of the dry clutch is larger than the boundary value. The roughness of the dry clutch is at least any one of a change in a motor angular velocity, a change in a motor angular acceleration, and a change in a period of the motor angular velocity.

The entry condition may include a condition that the dry clutch mounted between the motor and the transmission is in a slip state and a dry clutch mounted between an engine and the motor is in an engaged state.

The entry condition may further include a condition that a resolver is in a normal state and a condition that the hybrid vehicle is in a normal state.

The entry condition may further include an environmental condition and the environmental condition may include an outdoor temperature condition that an outdoor temperature is in a predetermined outdoor temperature range and an atmospheric pressure condition that an atmospheric pressure is in a predetermined atmospheric pressure range.

The method may further include reducing the roughness counter of the dry clutch mounted between the motor and the transmission when the deviation is equal to or smaller than the threshold value.

According to yet another embodiment of the present inventive concept, a method for determining deterioration of a dry clutch mounted between a first power source and a second power source of a hybrid vehicle includes determining whether an entry condition to determine the deterioration of the dry clutch is satisfied. Roughness of the first power source and roughness of the second power source are determined when the entry condition is satisfied. A deviation between the roughness of the first power source and the roughness of the second power source is calculated. The deviation is compared with a threshold value. A roughness counter of the dry clutch is increased when the deviation is larger than the threshold value. The roughness counter of the dry clutch is compared with a boundary value. It is determined that the dry clutch deteriorates when the roughness counter of the dry clutch is larger than the boundary value. At least one of the first power source and the second power source is a motor, the roughness of the first power source is at least any one of an angular velocity of the first power source and a period of the angular velocity of the first power source, and the roughness of the second power source is at least any one of an angular velocity of the second power source and a period of the angular velocity of the second power source.

The entry condition may include a condition that the dry clutch is in an engaged state.

The entry condition may further include a condition that a crank shaft rotation sensor is in a normal state, a condition that a resolver is in a normal state, and a condition that the hybrid vehicle is in a normal state.

The entry condition may further include an environmental condition and the environmental condition may include an outdoor temperature condition that an outdoor temperature is in a predetermined outdoor temperature range and an atmospheric pressure condition that an atmospheric pressure is in a predetermined atmospheric pressure range.

The method may further include reducing the roughness counter of the dry clutch when the deviation is equal to or smaller than the threshold value.

As described above, according to an exemplary embodiment of the present inventive concept, it is possible to determine the deterioration of the dry clutch for the hybrid vehicle.

Further, even though a mounting position of the dry clutch changes depending on a configuration method of the hybrid vehicle, it is possible to easily determine the deterioration of the dry clutch by determining the deterioration of the dry clutch mounted between the engine and the motor and the deterioration of the dry clutch mounted between the motor and the transmission, respectively.

In addition, it is possible to determine the deterioration of the dry clutch based on signals of the crank shaft rotation sensor which measures an RPM of the existing engine and the resolver which measures an RPM of the motor, without adding a separate sensor.

DETAILED DESCRIPTION

Figure 1:
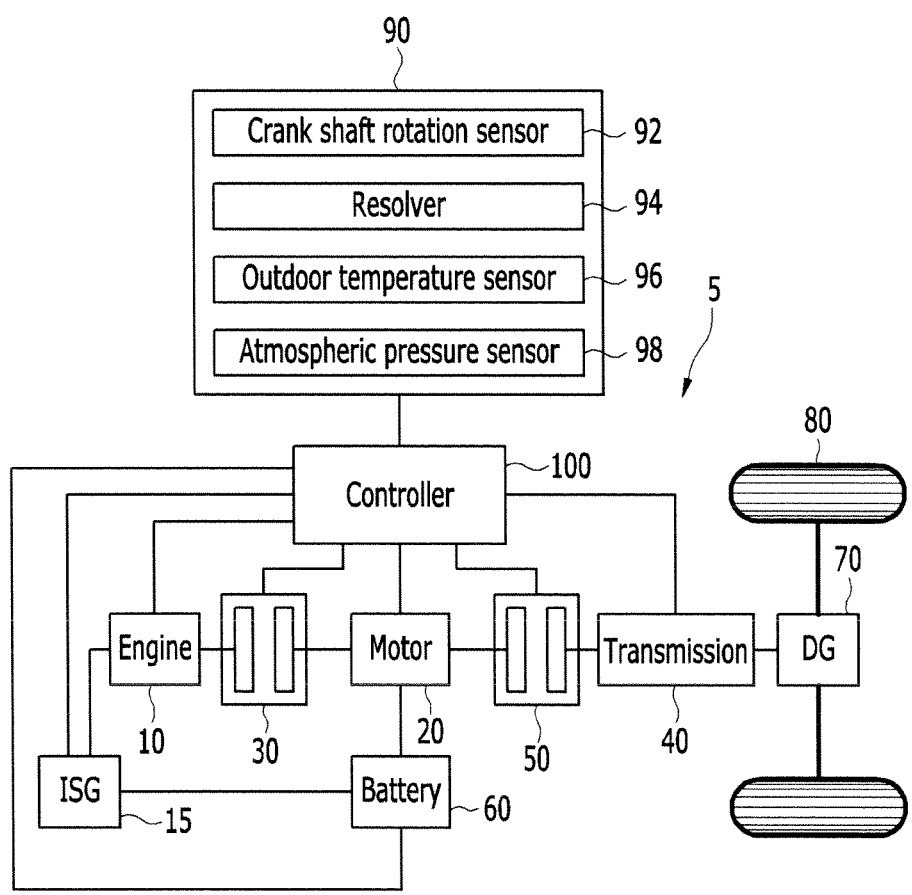
FIG. 1 is a block diagram conceptually illustrating a configuration of a hybrid vehicle according to an exemplary embodiment of the present inventive concept.

Hereinafter, embodiments of the present inventive concept will be described in detail with reference to the accompanying drawings so that those skilled in the art may easily practice the present disclosure.

A part irrelevant to the description will be omitted to clearly describe the present disclosure, and the same or similar elements will be designated by the same or similar reference numerals throughout the specification.

In addition, the size and thickness of each configuration shown in the drawings are arbitrarily shown for understanding and ease of description, but the present disclosure is not necessarily limited thereto.

FIG. 1 is a block diagram conceptually illustrating a configuration of a hybrid vehicle according to an exemplary embodiment of the present inventive concept.

As illustrated in FIG. 1, a hybrid vehicle 5 according to an exemplary embodiment of the present inventive concept includes a first clutch 30 which controls power of an engine 10, power of a motor 20, and power between the engine 10 and the motor 20, a transmission 40, a second clutch 50 which connects the motor 20 to an input shaft of the transmission 40, a high voltage battery 60, an integrated starter generator 15 which starts the engine 10 or generates power by an output of the engine 10, a differential gear device 70, a wheel 80, a data detector 90, and a controller 100.

The hybrid vehicle 5 illustrated in FIG. 1 shows one example of various structures of hybrid vehicles, and a spirit of the present disclosure is not restrictively applied to a hybrid vehicle described in the present specification but may be applied to various hybrid vehicles including a dry clutch.

Figure 5A:
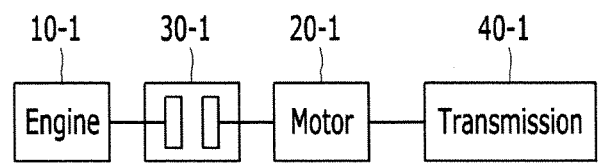
FIGS. 5A to 5C are block diagrams conceptually illustrating a configuration of a hybrid vehicle according to another exemplary embodiment of the present inventive concept.
Figure 5B:
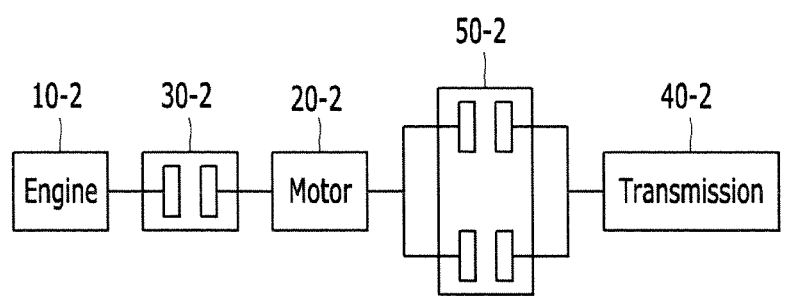
Figure 5C:
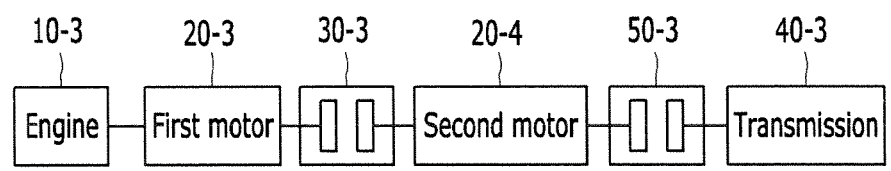

As illustrated in FIGS. 5A to 5C, mounting positions of different power sources (engine and motor) and dry clutches 30-1, 30-2, 30-3, 50-2, and 50-3 may be different depending on a structure of a hybrid vehicle, but a method for determining deterioration of a dry clutch according to an exemplary embodiment of the present inventive concept may be likewise applied thereto. That is, the spirit of the present disclosure may be applied to even in the case in which a dual clutch transmission (DCT) including two dry clutches 50-2 is used.

As the first clutch 30 and the second clutch 50, a dry clutch may be applied. The first clutch 30 may be mounted between the engine 10 and the motor 20, and the second clutch 50 may be mounted between the motor 20 and the transmission 40.

The data detector 90 detects data for determining the deterioration of the dry clutch and the data detected by the data detector 90 are transferred to the controller 100.

The data detector 90 may include a crank shaft rotation sensor 92 which measures an engine angular velocity, a resolver 94 which measures a motor angular velocity, an outdoor temperature sensor 96 which measures an outdoor temperature, and an atmospheric pressure sensor 98 which measures atmospheric pressure.

According to the exemplary embodiment of the present inventive concept, the crank shaft rotation sensor 92 and the resolver 94 are sufficient to provide information on the engine angular velocity and the motor angular velocity to the controller 100. Therefore, it is to be understood that the crank shaft rotation sensor 92 and the resolver 94 may include any apparatus which may provide the information on the engine angular velocity and the motor angular velocity to the controller 100.

The controller 100 may be implemented by at least one microprocessor executed by a predetermined program. The predetermined program may include a series of instructions for performing each step included in the method for determining deterioration of a dry clutch according to the exemplary embodiment of the present inventive concept to be described below.

Hereinafter, the method for determining deterioration of a dry clutch will be described in detail with reference to FIGS. 2 to 4.

Figure 2:
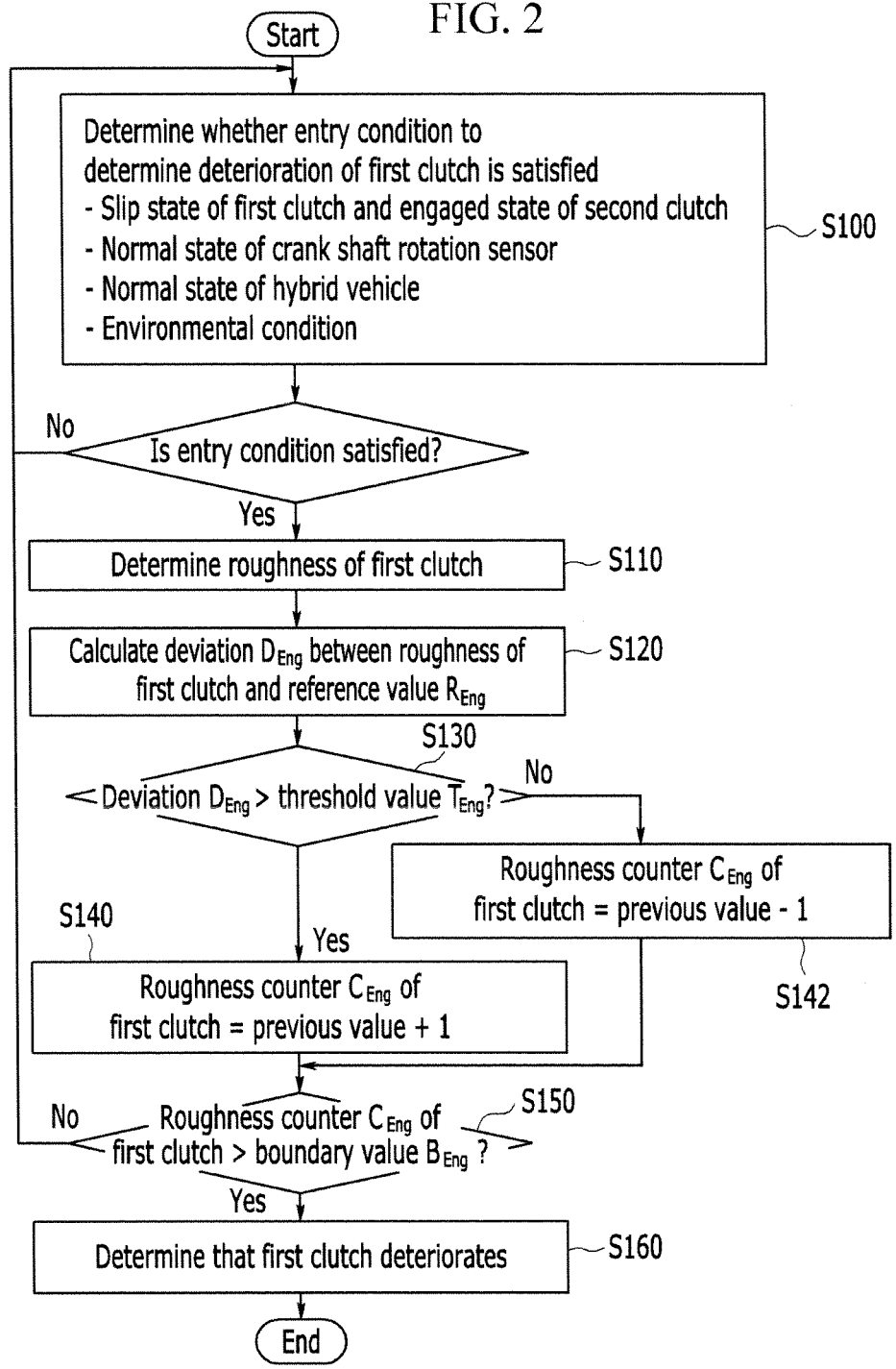
FIG. 2 is a flow chart of a method for determining deterioration of a dry clutch mounted between an engine and a motor according to an exemplary embodiment of the present inventive concept.

FIG. 2 is a flow chart of a method for determining deterioration of a dry clutch mounted between an engine and a motor according to an exemplary embodiment of the present inventive concept.

Referring to FIGS. 1 and 2, the controller 100 determines whether an entry condition to determine the deterioration of the first clutch 30 is satisfied (S100).

The entry condition to determine the deterioration of the first clutch 30 includes 1) a condition that the first clutch 30 is in a slip state and the second clutch 50 is in an engaged state. That is, the controller 100 determines whether the first clutch 30 deteriorates only when the first clutch 30 is in the slip state and the second clutch 50 is in the engaged state.

The entry condition to determine the deterioration of the first clutch 30 may further include 2) a condition that the crank shaft rotation sensor 92 is in a normal state. As described to be below, to determine the deterioration of the first clutch 30 based on a change in the engine angular velocity, the crank shaft rotation sensor 92 needs to be in the normal state.

The entry condition to determine the deterioration of the first clutch 30 may further include 3) a condition that the hybrid vehicle 5 is in a normal state. To determine the deterioration of the first clutch 30 without being affected by other factors, each component (engine, motor, transmission, battery, and the like) of the hybrid vehicle 5 basically needs to be in the normal state.

The entry condition to determine the deterioration of the first clutch 30 may further include 4) an environmental condition. The environmental condition may include an outdoor temperature condition, an atmospheric pressure condition, and the like. For example, the outdoor temperature condition may be satisfied when the outdoor temperature is in a predetermined outdoor temperature range, and the atmospheric pressure condition may be satisfied when the atmospheric pressure is in a predetermined atmospheric pressure range.

When the entry condition to determine the deterioration of the first clutch 30 is satisfied, the controller 100 determines roughness of the first clutch 30 based on a signal of the crank shaft rotation sensor 92 (S110). When the first clutch 30 is in the normal state, the engine angular velocity is uniformly distributed and has a periodic frequency component. However, as the deterioration of the first clutch 30 is progressed, the engine angular velocity is irregularly changed, and thus, engine angular acceleration and the frequency component are also changed. Here, the change in the engine angular velocity, the change in the engine angular acceleration, or a change in a period of the engine angular velocity may be referred to as the roughness of the first clutch 30.

The controller 100 calculates a deviation $D_{Eng}$ between the roughness of the first clutch 30 and a reference value $R_{Eng}$ (S120). The reference value $R_{Eng}$ may be set to be a value corresponding to the roughness of the first clutch 30 among a reference value to determine the change in the engine angular velocity, a reference value to determine the change in the engine angular acceleration, and a reference value to determine the change in the period of the engine angular velocity.

The controller 100 compares the deviation $D_{Eng}$ with a threshold value $T_{Eng}$ (S130). The threshold value $T_{Eng}$ may be set to be a value which is determined by those skilled in the art in consideration of specifications and the like of the first clutch 30.

The controller 100 may increase a roughness counter $C_{Eng}$ of the first clutch 30 by 1 when the deviation $D_{Eng}$ is larger than the threshold value $T_{Eng}$ (S140). On the other hand, the controller 100 may reduce the roughness counter $C_{Eng}$ of the first clutch 30 by 1 when the deviation $D_{Eng}$ is equal to or smaller than the threshold value $T_{Eng}$ (S142).

The controller 100 compares the roughness counter $C_{Eng}$ of the first clutch 30 with a boundary value $B_{Eng}$ (S150). The boundary value $B_{Eng}$ may be set to be a value which is determined by those skilled in the art in consideration of specifications and the like of the first clutch 30.

The controller 100 determines that the first clutch 30 deteriorates when the roughness counter $C_{Eng}$ of the first clutch 30 is larger than the boundary value $B_{Eng}$ (S160).

The controller 100 may again start from step S100 when the roughness counter $C_{Eng}$ of the first clutch 30 is equal to or smaller than the boundary value $B_{Eng}$.

Figure 3:
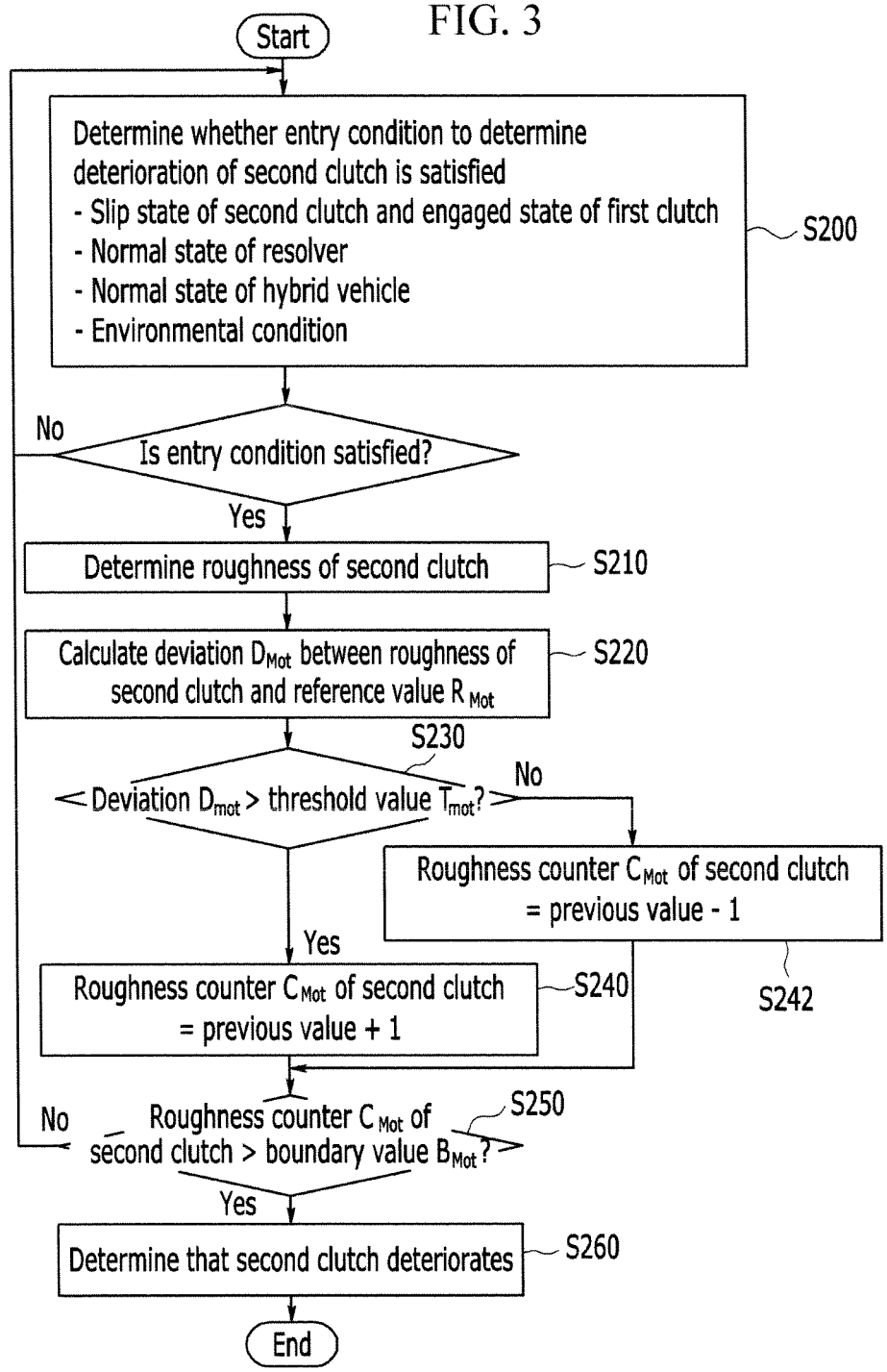
FIG. 3 is a flow chart of a method for determining deterioration of a dry clutch mounted between a motor and a transmission according to an exemplary embodiment of the present inventive concept.

FIG. 3 is a flow chart of a method for determining deterioration of a dry clutch mounted between a motor and a transmission according to an exemplary embodiment of the present inventive concept.

Referring to FIGS. 1 and 3, the controller 100 determines whether an entry condition to determine the deterioration of the second clutch 50 is satisfied (S200).

The entry condition to determine the deterioration of the second clutch 50 includes 1) a condition that the second clutch 50 is in a slip state and the first clutch 30 is in an engaged state. That is, the controller 100 determines whether the second clutch 50 deteriorates only when the second clutch 50 is in the slip state and the first clutch 30 is in the engaged state.

The entry condition to determine the deterioration of the second clutch 50 may further include 2) a condition that the resolver 94 is in a normal state. As described to be below, to determine the deterioration of the second clutch 50 based on a change in the motor angular velocity, the resolver 94 needs to be in the normal state.

The entry condition to determine the deterioration of the second clutch 50 may further include 3) a condition that the hybrid vehicle 5 is in a normal state. To determine the deterioration of the second clutch 50 without being affected by other factors, each component (engine, motor, transmission, battery, and the like) of the hybrid vehicle 5 needs to be in the normal state.

The entry condition to determine the deterioration of the second clutch 50 may further include 4) an environmental condition. The environmental condition may include an outdoor temperature condition, the atmospheric pressure condition, and the like. For example, the outdoor temperature condition may be satisfied when an outdoor temperature is in a predetermined outdoor temperature range and the atmospheric pressure condition may be satisfied when an atmospheric pressure is in a predetermined atmospheric pressure range.

When the entry condition to determine the deterioration of the second clutch 50 is satisfied, the controller 100 determines roughness of the second clutch 50 based on a signal of the resolver 94 (S210). When the second clutch 50 is in the normal state, the motor angular velocity is uniformly distributed and has a periodic frequency component. However, as the deterioration of the second clutch 50 is progressed, the motor angular velocity irregularly changes, and thus, a motor angular acceleration and the frequency component also change. Here, the change in the motor angular velocity, the change in the motor angular acceleration, or a change in a period of the motor angular velocity may be referred to as the roughness of the second clutch 50.

The controller 100 calculates a deviation $D_{Mot}$ between the roughness of the second clutch 50 and a reference value $R_{Mot}$ (S220). The reference value $R_{Eng}$ may be set to be a value corresponding to the roughness of the second clutch 50 among a reference value to determine the change in the motor angular velocity, a reference value to determine the change in the motor angular acceleration, and a reference value to determine the change in the period of the motor angular velocity.

The controller 100 compares the deviation $D_{Mot}$ with a threshold value $T_{Mot}$ (S230). The threshold value $T_{Mot}$ may be set to be a value which is determined by those skilled in the art in consideration of specifications and the like of the second clutch 50.

The controller 100 may increase a roughness counter $C_{Mot}$ of the second clutch 50 by 1 when the deviation $D_{Mot}$ is larger than the threshold value $T_{Mot}$ (S240). On the other hand, the controller 100 may reduce the roughness counter $C_{Mot}$ of the second clutch 50 by 1 when the deviation $D_{Mot}$ is equal to or smaller than the threshold value $T_{Mot}$ (S242).

The controller 100 compares the roughness counter $C_{Mot}$ of the second clutch 50 with a boundary value $B_{Mot}$ (S250). The boundary value $B_{Mot}$ may be set to be a value which is determined by those skilled in the art in consideration of specifications, and the like of the second clutch 50.

The controller 100 determines that the second clutch 50 deteriorates when the roughness counter $C_{Mot}$ of the second clutch 50 is larger than the boundary value $B_{Mot}$ (S260).

The controller 100 may again start from step S200 when the roughness counter $C_{Mot}$ of the second clutch 50 is equal to or smaller than the boundary value $B_{Mot}$.

Figure 4:
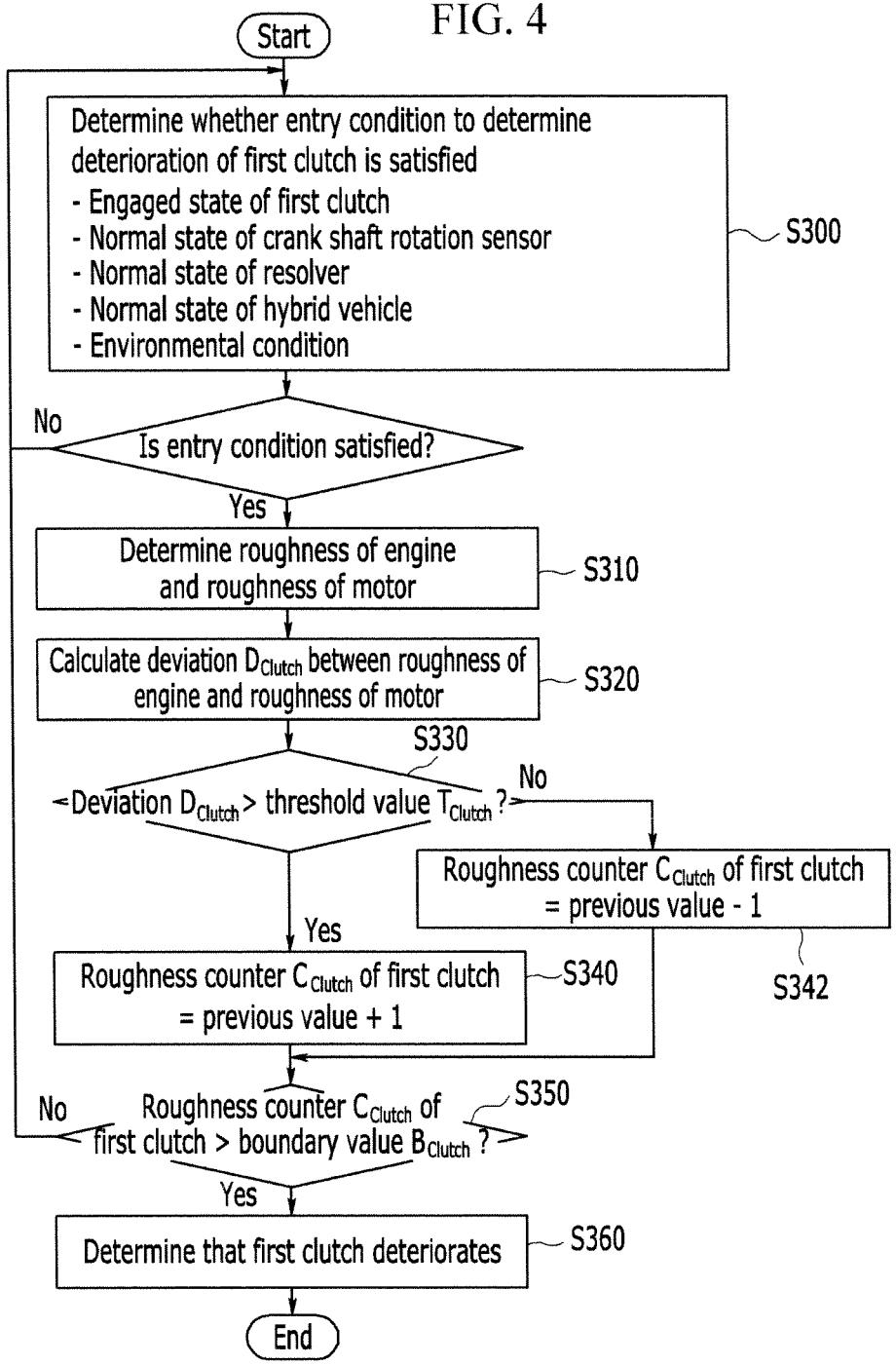
FIG. 4 is a flow chart of a method for determining deterioration of a dry clutch mounted between a first power source and a second power source according to an exemplary embodiment of the present inventive concept.

FIG. 4 is a flow chart of a method for determining deterioration of a dry clutch mounted between a first power source and a second power source according to an exemplary embodiment of the present inventive concept. Hereinafter, a method for determining deterioration of a dry clutch based on the first clutch 30 mounted between the engine 10 included as a first power source and the motor 20 included as a second power source, that is, different power sources will be described. Deterioration of a dry clutch 30-3 mounted between the same power sources 20-3 and 20-4 illustrated in FIG. 5C may be determined by the same method.

Referring to FIGS. 1 and 4, the controller 100 determines whether an entry condition to determine the deterioration of the first clutch 30 is satisfied (S300).

An entry condition to determine deterioration of the first clutch 30 includes 1) a condition that the first clutch 30 is in an engaged state. That is, the controller 100 determines the deterioration of the first clutch 30 only when the first clutch 30 is in the engaged state.

The entry condition to determine the deterioration of the first clutch 30 may further include 2) a condition that the crank shaft rotation sensor 92 is in a normal state. As described to be below, to determine the deterioration of the first clutch 30 based on the engine angular velocity, the crank shaft rotation sensor 92 needs to be in the normal state.

The entry condition to determine the deterioration of the first clutch 30 may further include 3) a condition that the resolver 94 is in a normal state. As described to be below, to determine the deterioration of the first clutch 30 based on the motor angular velocity, the resolver 94 needs to be in the normal state.

The entry condition to determine the deterioration of the first clutch 30 may further include 4) a condition that the hybrid vehicle 5 is in a normal state. To determine the deterioration of the first clutch 30 without being affected by other factors, each component (engine, motor, transmission, battery, and the like) of the hybrid vehicle 5 basically needs to be in the normal state.

The entry condition to determine the deterioration of the first clutch 30 may further include 5) an environmental condition. The environmental condition may include an outdoor temperature condition, an atmospheric pressure condition, and the like. For example, the outdoor temperature condition may be satisfied in the case in which an outdoor temperature is in a predetermined outdoor temperature range, and the atmospheric pressure condition may be satisfied in the case in which an atmospheric pressure is in a predetermined atmospheric pressure range.

When the entry condition to determine the deterioration of the first clutch 30 is satisfied, the controller 100 determines the roughness of the engine 10 based on the signal of the crank shaft rotation sensor 92 and determines the roughness of the motor 20 based on the signal of the resolver 94 (S310). Here, the engine angular velocity or the period of the engine angular velocity may be referred to as the roughness of the engine 10, and the motor angular velocity or the period of the motor angular velocity may be referred to as the roughness of the motor 20.

The controller 100 calculates a deviation $D_{Clutch}$ between the roughness of the engine 10 and the roughness of the motor 20 (S320). As the deterioration of the first clutch 30 is progressed, the deviation $D_{Clutch}$ may occur even in the state in which the first clutch 30 is engaged.

The controller 100 compares the deviation $D_{Clutch}$ with a threshold value $T_{Clutch}$ (S330). The threshold value $T_{Clutch}$ may be set to be a value which is determined by those skilled in the art in consideration of specifications and the like of the first clutch 30.

The controller 100 may increase a roughness counter $C_{Clutch}$ of the first clutch 30 by 1 when the deviation $D_{Clutch}$ is larger than the threshold value $T_{Clutch}$ (S340). On the other hand, the controller 100 may reduce a roughness counter $C_{Clutch}$ of the first clutch 30 by 1 when the deviation $D_{Clutch}$ is equal to or smaller than the threshold value $T_{Clutch}$ (S342).

The controller 100 compares the roughness counter $C_{Clutch}$ of the first clutch 30 with a boundary value $B_{Clutch}$ (S350). The boundary value $B_{Clutch}$ may be set to be a value which is determined by those skilled in the art in consideration of specifications and the like of the first clutch 30.

The controller 100 determines that the first clutch 30 deteriorates when the roughness counter $C_{Clutch}$ of the first clutch 30 is larger than the boundary value $B_{Clutch}$ (S360).

The controller 100 may again start from step S300 when the roughness counter $C_{Clutch}$ of the first clutch 30 is equal to or smaller than the boundary value $B_{Clutch}$.

As described above, according to the exemplary embodiment of the present inventive concept, it is possible to determine the deterioration of the dry clutch for the hybrid vehicle 5.

Further, even though a mounting position of a dry clutch is changed depending on a configuration method of a hybrid vehicle, deterioration of the dry clutch may be determined by determining the deterioration of the dry clutch 30 mounted between the engine 10 and the motor 20 and the deterioration of the dry clutch 50 mounted between the motor 20 and the transmission 40, respectively.

It is possible to determine the deterioration of the dry clutch based on the signals of the crank shaft rotation sensor 92 which measures an RPM of the existing engine and the resolver 94 which measures an RPM of the motor, without adding a separate sensor.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A method for determining deterioration of a dry clutch mounted between an engine and a motor of a hybrid vehicle, the method comprising steps of: measuring an engine angular velocity by a crank shaft rotation sensor;
   determining whether an entry condition to determine the deterioration of the dry clutch is satisfied;
   determining roughness of the dry clutch when the entry condition is satisfied;
   calculating a deviation between the roughness of the dry clutch and a reference value;
   comparing the deviation with a threshold value;
   increasing a roughness counter of the dry clutch when the deviation is larger than the threshold value;
   comparing the roughness counter of the dry clutch with a boundary value; and
   determining that the dry clutch deteriorates when the roughness counter of the dry clutch is larger than the boundary value,
   wherein the roughness of the dry clutch is at least any one of a change in an engine angular velocity, a change in an engine angular acceleration, and a change in a period of the engine angular velocity.

2. The method of claim 1, wherein the entry condition includes a condition that the dry clutch mounted between the engine and the motor is in a slip state and a dry clutch mounted between the motor and a transmission is in an engaged state.

3. The method of claim 2, wherein the entry condition further includes a condition that the crank shaft rotation sensor is in a normal state and a condition that the hybrid vehicle is in a normal state.

4. The method of claim 2, wherein the entry condition further includes an environmental condition which includes an outdoor temperature condition that an outdoor temperature is in a predetermined outdoor temperature range and an atmospheric pressure condition that an atmospheric pressure is in a predetermined atmospheric pressure range.

5. The method of claim 1, further comprising a step of reducing the roughness counter of the dry clutch mounted between the engine and the motor when the deviation is equal to or smaller than the threshold value.

6. A method for determining deterioration of a dry clutch mounted between a motor and a transmission of a hybrid vehicle, the method comprising steps of: measuring a motor angular velocity by a resolver;
   determining whether an entry condition to determine the deterioration of the dry clutch mounted between the motor and the transmission is satisfied;
   determining roughness of the dry clutch when the entry condition is satisfied;
   calculating a deviation between the roughness of the dry clutch and a reference value;
   comparing the deviation with a threshold value;
   increasing a roughness counter of the dry clutch when the deviation is larger than the threshold value;
   comparing the roughness counter of the dry clutch with a boundary value; and
   determining that the dry clutch mounted between the motor and the transmission deteriorates when the roughness counter of the dry clutch is larger than the boundary value,
   wherein the roughness of the dry clutch is at least any one of a change in a motor angular velocity, a change in a motor angular acceleration, and a change in a period of the motor angular velocity.

7. The method of claim 6, wherein the entry condition includes a condition that the dry clutch mounted between the motor and the transmission is in a slip state and a dry clutch mounted between an engine and the motor is in an engaged state.

8. The method of claim 7, wherein the entry condition further includes a condition that the resolver is in a normal state and a condition that the hybrid vehicle is in a normal state.

9. The method of claim 7, wherein the entry condition further includes an environmental condition which includes an outdoor temperature condition that an outdoor temperature is in a predetermined outdoor temperature range and an atmospheric pressure condition that an atmospheric pressure is in a predetermined atmospheric pressure range.

10. The method of claim 6, further comprising a step of reducing the roughness counter of the dry clutch mounted between the motor and the transmission when the deviation is equal to or smaller than the threshold value.

11. A method for determining deterioration of a dry clutch mounted between a first power source and a second power source of a hybrid vehicle, the method comprising steps of: measuring an angular velocity of the first power source by a crank shaft rotation sensor and measuring an angular velocity of the second power source by a resolver;
   determining whether an entry condition to determine the deterioration of the dry clutch is satisfied;
   determining roughness of the first power source and roughness of the second power source when the entry condition is satisfied;
   calculating a deviation between the roughness of the first power source and the roughness of the second power source;
   comparing the deviation with a threshold value;
   increasing a roughness counter of the dry clutch when the deviation is larger than the threshold value;
   comparing the roughness counter of the dry clutch with a boundary value; and
   determining that the dry clutch deteriorates when the roughness counter of the dry clutch is larger than the boundary value,
   wherein at least one of the first power source and the second power source is a motor, the roughness of the first power source is at least any one of an angular velocity of the first power source and a period of the angular velocity of the first power source, and the roughness of the second power source is at least any one of an angular velocity of the second power source and a period of the angular velocity of the second power source.

12. The method of claim 11, wherein the entry condition includes a condition that the dry clutch is in an engaged state.

13. The method of claim 12, wherein the entry condition further includes a condition that the crank shaft rotation sensor is in a normal state, a condition that the resolver is in a normal state, and a condition that the hybrid vehicle is in a normal state.

14. The method of claim 12, wherein the entry condition further includes an environmental condition which includes an outdoor temperature condition that outdoor temperature is in a predetermined outdoor temperature range and an atmospheric pressure condition that an atmospheric pressure is in a predetermined atmospheric pressure range.

15. The method of claim 11, further comprising a step of reducing the roughness counter of the dry clutch when the deviation is equal to or smaller than the threshold value.

16. A non-transitory computer-readable recording medium comprising computer executable instructions execution of which causes a controller to perform the method according to claim 1.

17. A non-transitory computer-readable recording medium comprising computer executable instructions execution of which causes a controller to perform the method according to claim 6.

18. A non-transitory computer-readable recording medium comprising computer executable instructions execution of which causes a controller to perform the method according to claim 11.

* * * * *